(12) United States Patent
Fabrizi et al.

(10) Patent No.: US 7,602,619 B2
(45) Date of Patent: Oct. 13, 2009

(54) SUPPORT FRAME AND GROUP OF PARTS FOR WALL MOUNTING AN ELECTRICAL APPARATUS

(75) Inventors: Fabrizio Fabrizi, Bergamo (IT); Renato De Ambroggi, Cocquio Trevisago (IT); Enrico Pianezzola, Luvinate (IT); Ennio Calderara, Cuasso al Piano (IT)

(73) Assignee: BTICINO S.p.A., Milan (IT)

( * ) Notice: Subject to any disclaimer, the term of this patent is extended or adjusted under 35 U.S.C. 154(b) by 157 days.

(21) Appl. No.: 11/910,890

(22) PCT Filed: Apr. 3, 2006

(86) PCT No.: PCT/IT2006/000216
§ 371 (c)(1),
(2), (4) Date: Dec. 12, 2007

(87) PCT Pub. No.: WO2006/106552
PCT Pub. Date: Oct. 12, 2006

(65) Prior Publication Data
US 2008/0205029 A1 Aug. 28, 2008

(30) Foreign Application Priority Data
Apr. 7, 2005 (IT) .................. RM2005A0162

(51) Int. Cl.
*H05K 7/02* (2006.01)
*H05K 7/04* (2006.01)
(52) U.S. Cl. ..................................... 361/807; 361/801
(58) Field of Classification Search ......... 361/800–802, 361/807–810; 439/953, 939, 848, 346

See application file for complete search history.

(56) References Cited

U.S. PATENT DOCUMENTS 3,814,834 A * 6/1974 Glader .................... 174/57

(Continued)

FOREIGN PATENT DOCUMENTS

EP 0 546 642 A1 6/1993

(Continued)

OTHER PUBLICATIONS

International Preliminary Report on Patentability, PCT/IT2006/000216, Jul. 24, 2007, European Patent Office.

*Primary Examiner*—Hung S Bui
(74) *Attorney, Agent, or Firm*—Hogan & Hartson LLP

(57) ABSTRACT

The present invention refers to a support frame (2) for wall-mounting at least one electrical apparatus, the frame (2) comprising:—a frame body (7) fixable to the wall and developing about a window (9) defining a mounting seat adapted for receiving and holding said at least one electrical apparatus; and—fixing means (12) for removably fixing a cover plate (3) to the support frame (2). The support frame (2) is characterised in that the fixing means includes at least one fixing channel (12) exhibiting an end jointed to an opening (13) obtained in the frame body (7), the fixing channel (12) being such as to be capable of receiving, through the opening (13), a corresponding fixing tongue (4), provided in the cover plate (3), the fixing channel (12) including therein relief means (14) that can face a surface (31) of the tongue (4) and pushing means (20, 21) adapted for acting on the fixing tongue (4) for engaging pressure-wise said surface (31) of the tongue against said relief means (14) of the channel (12).

9 Claims, 3 Drawing Sheets

U.S. PATENT DOCUMENTS

| | | | |
|---|---|---|---|
| 3,876,821 A * | 4/1975 | Pringle ........................ 174/53 |
| 3,952,475 A * | 4/1976 | Paskert ........................ 52/750 |
| 4,098,423 A * | 7/1978 | Marrero ...................... 220/3.6 |
| 4,311,422 A * | 1/1982 | Jackovitz .................... 411/112 |
| 4,733,330 A * | 3/1988 | Tanaka et al. ............... 361/641 |
| 4,954,667 A * | 9/1990 | Jorgensen et al. ............. 174/53 |
| 5,383,793 A * | 1/1995 | Hsu et al. ................... 439/327 |
| 5,594,205 A * | 1/1997 | Cancellieri et al. ........... 174/53 |
| 6,410,850 B1 | 6/2002 | Abel et al. |
| 6,552,269 B1 | 4/2003 | Conner |
| 7,306,482 B1 * | 12/2007 | Kidman ...................... 439/538 |
| 2005/0044767 A1 * | 3/2005 | Lasher ........................ 40/757 |

FOREIGN PATENT DOCUMENTS

EP    1 094 579 A1    4/2001

* cited by examiner

SUPPORT FRAME AND GROUP OF PARTS FOR WALL MOUNTING AN ELECTRICAL APPARATUS

CROSS-REFERENCE TO RELATED APPLICATIONS

The present application is a national filing in the U.S. Patent & Trademark Office of PCT/IT2006/000216 filed Apr. 3, 2006, and claims priority of Italy Patent Application No. RM2005A000162 filed Apr. 7, 2005, both of which applications are incorporated herein in their entireties by this reference.

FIELD OF THE INVENTION

The present invention relates to the technical field of electrical systems for homes and offices, and more in particular, it relates to a support frame and a composite structure, or group of parts, including such frame, for wall-mounting one or more electrical apparatuses.

BACKGROUND OF THE INVENTION

For the purposes of the present description, by electrical apparatus we mean, in general, any means or electrical device generally being part of electrical installations in civil buildings and the like and usually intended to be mounted, for example built in, onto walls of such buildings.

This definition therefore includes, not limitingly, switches, electrical power sockets, sockets for data networks, TV sockets, telephone sockets, buttons, commutators, deviators, electrical adjustment devices in general, connectors, thermostats, timers, fuse holders, alarms/buzzers, emergency lights, for example removable, signalling lights, for example step markers, displays, for example LCD and the like.

As known, many of the aforementioned electrical apparatuses are usually installed on a wall using composite mounting structures, or groups of parts, generally including:

a box intended to be built into the wall;

an apparatus-carrying mounting frame (or support frame) fixable to the box and comprising a frame body developing about an opening defining a mounting seat suitable for receiving and holding one or more electrical apparatuses; and a cover plate that can be removably fixed to the frame and provided with an opening for allowing a user to gain access, visually or manually, the electrical apparatuses installed on the support frame.

In the prior art, several systems are known for removably fixing a cover plate to a support frame. For example, screw fixing systems are known, which despite being sturdy are almost outdated since they are unaesthetic.

Several snap-wise fixing systems between plate and frame also belong to the prior art. For example, it is known to provide a plurality of tongues on an edge portion of the plate intended for facing the support frame, adapted for engaging snap-wise with respective protruding edges provided on the external perimeter of the support frame.

The snap-wise fixing systems of the prior art, despite being highly used, in some cases exhibit a problem of fragility of the snap-wise fixing elements, in other cases are not such as to prevent an accidental detachment of the plate from the support frame.

SUMMARY OF THE INVENTION

The object of the present invention is to provide a support frame which should be provided with an innovative fixing system to a cover plate and which should allow overcoming the disadvantages described above with reference to the prior art.

Such object is achieved by a support frame as defined in the annexed first claim in the most general form thereof and in the dependent claims in some particular embodiments.

The object of the present invention also is a group of parts as defined in the annexed claim 10.

BRIEF DESCRIPTION OF THE DRAWINGS

The invention shall be better understood from the following detailed description of a particularly preferred embodiment thereof, made by way of a non-limiting example with reference to the annexed drawings, wherein.

In the figures, like or similar elements shall be indicated by the same reference numerals.

DETAILED DESCRIPTION OF THE PREFERRED EMBODIMENT

Figure 1:
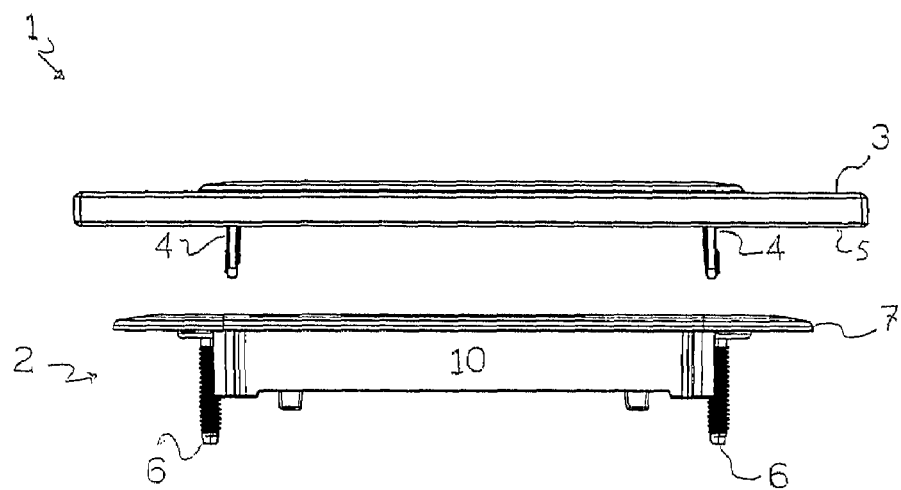
FIG. 1 shows a side view of a particularly preferred embodiment of a plate-frame group according to the present invention.

FIG. 1 shows a side view of a particularly preferred embodiment of a plate-frame group of parts, globally indicated with reference numeral 1, according to the present invention.

The plate-frame group of parts includes a support frame 2 and a cover plate 3 removably fixable to the support frame 2. For fixing to the support frame 2, fixing elements shaped as tongues 4 are provided on face 5 of the cover plate 2 facing the support frame 3. Preferably, the cover plate 3 includes four fixing tongues 4, of which only two are visible in FIG. 1.

As is known to the man skilled in the art, the role of such a cover plate 3 is both that of ensuring a minimal protection for the electrical apparatuses, for example from dust, and of that preventing dangerous access (for example, through pointed objects) to the electrically conducting parts of the electrical apparatuses. Another fundamental task assigned to the cover plates, moreover, is that of hiding any imperfections produced for example by the presence of the mounting frame and box which, rather than having an aesthetic value, have a functional value that is difficult to combine with aesthetic requirements or standards.

The cover plate 3 is substantially shaped as a frame and is provided with a central opening, not visible in FIG. 1, for allowing a user to access, visually or manually, the electrical apparatuses installed on the support frame 2.

The support frame 2 is in turn fixable to the wall, for example by a pair of screws 6 adapted for holding the support frame 2 anchored to a box flush mounted in the wall, not shown in the figures.

Figure 2:
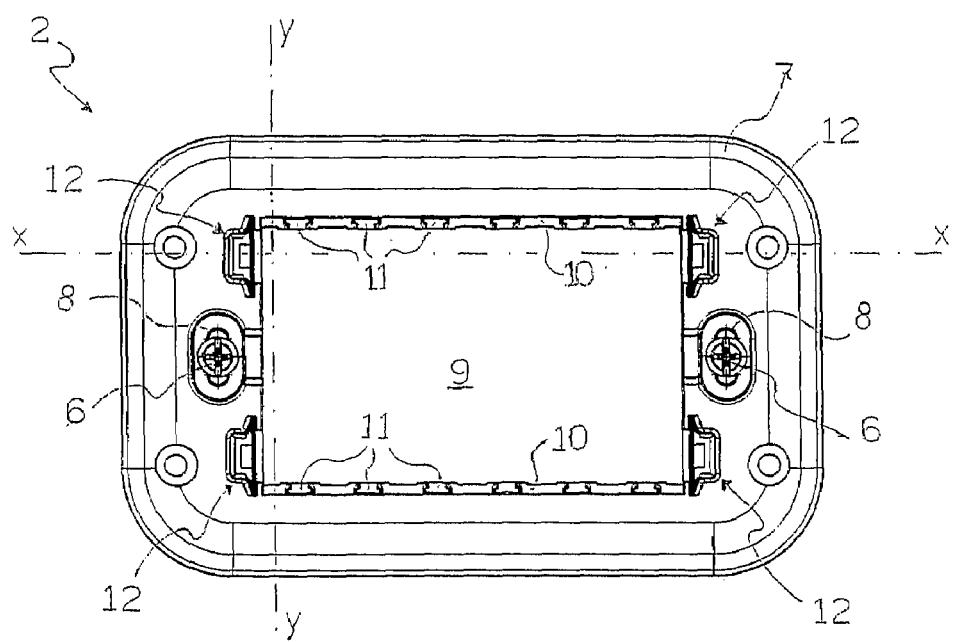
FIG. 2 shows a front plane view of the support frame belonging to the plate-frame group shown in FIG. 1.

As is better seen in the plan view shown in FIG. 2, the support frame 2 includes a frame body 7, preferably made of an insulating material and approximately having the shape of a substantially plate-shaped frame, as a non-limiting example, with quadrangular plan with rounded corners. By way of an example only, the frame body of frame 7 is shown with a substantially rectangular shape.

In the example, a pair of through holes 8, preferably slotted, is provided in the frame body 7 of frame 2. The through holes 8 are such as to be crossed by respective screws 6 in order to fix the support frame 2 to the box flush mounted in the wall.

The frame body 7 of the support frame 2 develops about a mounting window 9, defining a mounting seat adapted for receiving or holding one or more electrical apparatuses, not shown in the figures. Two opposed walls 10 of the support frame 2 face the mounting window 9, each including a plurality of hooking elements 11 that project from walls 10 towards the mounting window 9. These hooking elements 11 are such as to cooperate with corresponding hooking elements provided on two opposite sides of the electrical apparatuses to be hooked to the support frame 2. Preferably, such hooking elements 11 allow obtaining a joint-wise and a snap-wise hooking of the electrical apparatuses to the support frame 2.

The support frame 2 further includes fixing means 12 for removably fixing the cover plate 3 to the support frame.

Advantageously, such fixing means 12 comprises fixing channels 12 adapted for receiving respective fixing tongues 4 of the cover plate 3. Preferably but non-limiting, the number of fixing channels 12 provided in the support frame 2 is equal to four.

Figure 3:
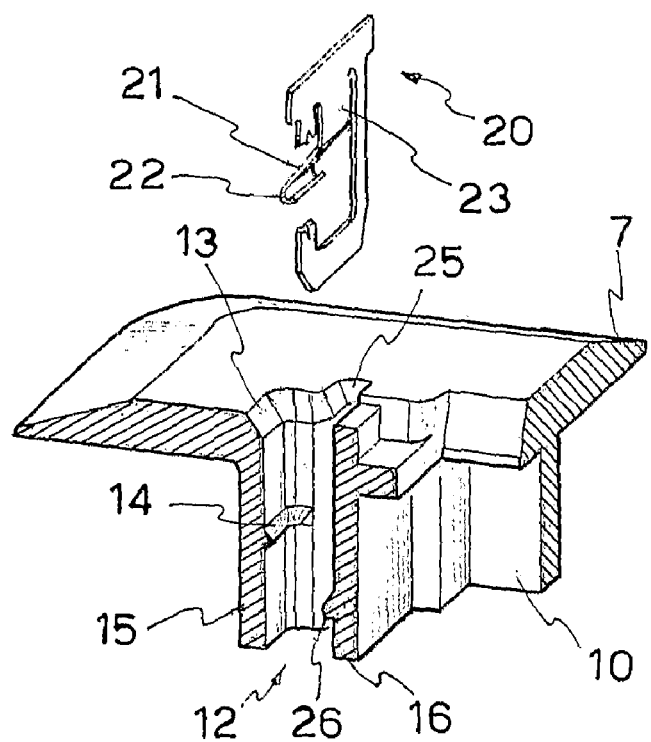
FIG. 3 shows an axonometric section view of the support frame of FIG. 2.

A fixing channel 12 is better visible in FIG. 3, which shows a section view along axes x-x and y-y of the support frame 2 of FIG. 2. In particular, a sectioned fixing channel 12 is visible in such figure.

The fixing channel 12 exhibits an end 13 jointed to an opening 13 obtained in the frame body 7 of the support frame 2, so as to receive therein, through opening 13, a fixing tongue 4 of the cover plate 3. Preferably, as shown in FIG. 3, the edge of the frame body 7 delimiting such opening 13 is chamfered so as to favour the introduction of the fixing tongue 4 into the fixing channel 12.

Advantageously, the fixing channel 12 includes relief means 14 therein. Preferably, such relief means includes at least one protruding edge 14, for example with triangular profile, projecting from a wall 15 of the channel inwards of channel 12.

Advantageously, the fixing channel 12 further includes pushing means 20 opposite the relief means 14. In FIG. 3, for clarity, the pushing means 20 is shown separate from the fixing channel 12. Such pushing means 20, 21 is such as to exert a pressure against the fixing tongue 4 of the cover plate 3, so that a surface of such fixing tongue 4 engages pressure-wise against the protruding edge 14 when the cover plate 3 is fixed to the support frame 2.

In a particularly advantageous embodiment, the pushing means 20, 21 includes a tooth 21 flexible and inclined relative to the direction of extension of the fixing channel 12. Such tooth has an end 22 protruding inwards of channel 12 and an opposite end 23 constrained to the wall of channel 16 opposite the wall of channel 15 including the relief means 14. Preferably, end 22 of tooth 21 protruding inwards of channel 12 is a curved end.

In a particularly preferred embodiment, the flexible tooth 21 is a metal tooth being part of a sheet element 20 insertable, preferably joint-wise and snap-wise, in a notch 25 adjacent the fixing channel 12.

Figure 4:
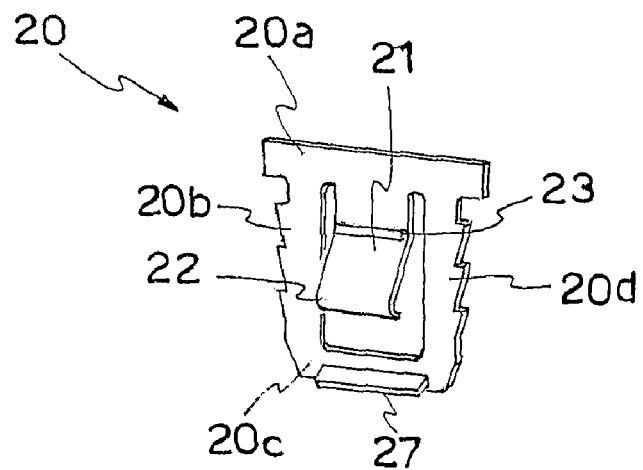
FIG. 4 shows an axonometric view of a sheet element associable to the support frame of FIG. 2.

The sheet element 20 is shown in a partial view in FIG. 3 and in an overall and more detailed view in FIG. 4. Such sheet element 20 preferably is a metal sheet including a frame base portion 20a, 20b, 20c, 20d intended for being inserted in notch 25. The frame base portion 20a, 20b, 20c, 20d consists of four walls substantially parallel by twos. One of such walls, that is, wall 20a, is jointed to the flexible tooth 22. Wall 20c opposite wall 20a, in the introduction of sheet 20 into notch 25, is intended for passing over a projecting element 26 which protrudes from the wall of channel 16, for locking snap-wise sheet 20 to the support frame 2. Preferably, wall 20c of sheet 20 exhibits a wall portion 27 slightly inclined relative to the plane on which the base portion 20a, 20b, 20c, 20d of sheet 20 lays, in order to allow the projecting element 26 to be passed over by wall 20c in the snap-wise introduction of sheet 20 into notch 25.

Preferably, the other two walls 20b, 20d of the sheet element 20 exhibit a notched outside edge advantageously adapted for allowing the forced and irreversible mounting of sheet 20 into notch 25.

Figure 5A:
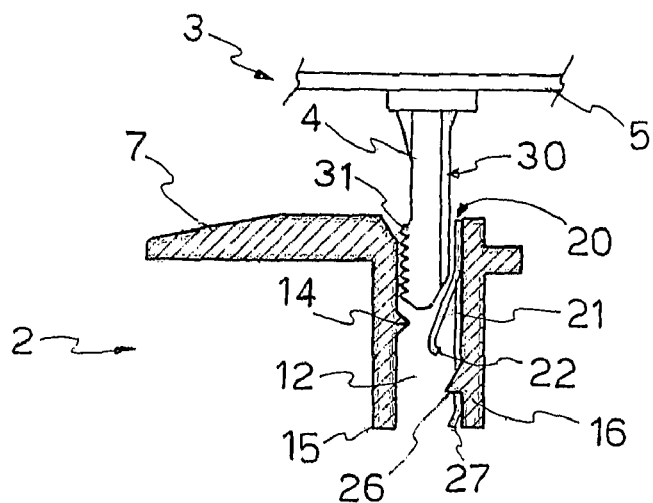
FIGS. 5a and 5b show a partial section view of the plate-frame group of FIG. 1 in two different operating positions between the covering plate and the support frame.
Figure 5B:
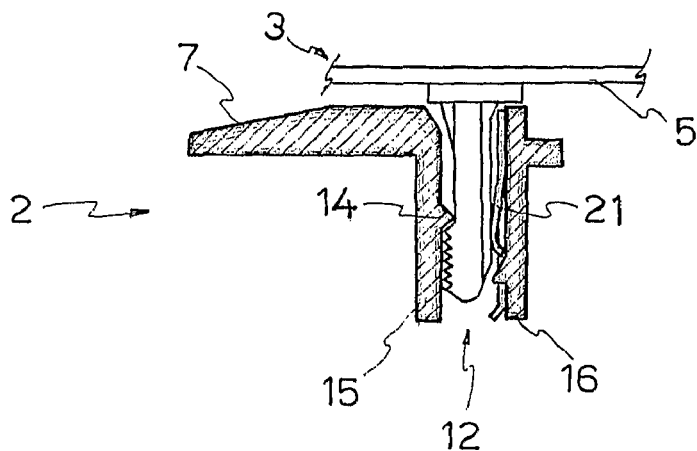

FIGS. 5a and 5b show two partial views of the cover plate 3 and of the support frame 2 in two different operating positions. In such figures, the cover plate 3 advantageously includes a fixing tongue 4, provided with a first surface 31 at least partly shaped as a saw tooth and a second surface 30 substantially smooth and opposite the first shaped surface 31.

The first surface 31, thanks to the pushing action exerted by tooth 21 is such as to engage pressure-wise against the protruding edge 14 provided in the fixing channel 12 for holding the cover plate 3 constrained to the support frame 2.

The second surface 30, during the introduction of the fixing tongue 4 in the fixing channel 12 is such as to interfere by sliding against the flexible tooth 21. After the introduction, the flexible tooth 21 is such as to exert a pushing action on such surface 30 which determines a slight bending of the fixing tongue 4. Thanks to such bending, not visible in the figures, the shaped surface 31 of the fixing tongue 4 is held pressure-wise against the protruding edge 14 provided inside the fixing channel 12.

Figure 6:
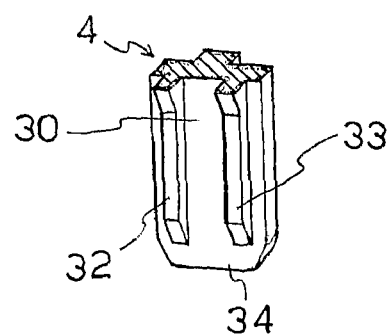
FIG. 6 shows an enlarged detail of the cover plate of the plate-frame group of FIG. 1.

In a particularly preferred embodiment, as shown in FIG. 6, the fixing tongue 4 has a substantially plate-like shape and is provided with relief thickening elements 32, 33 obtained on the surface of tongue 30 intended for cooperating with the flexible tooth 21. In the practice, the flexible tooth 21 is such as to apply a pushing force on such elements 32, 33, thus allowing a constant pressure to be maintained on the fixing tongue 4, in order to advantageously maintain the disconnection force of the cover plate 3 from the support frame 2 constant over time, irrespective of the number of manoeuvres carried out.

In the particularly preferred embodiment of FIG. 6, the fixing tongue is further provided with a chamfered end portion 34 in order to facilitate the centring and the introduction of the fixing tongue 4 into the fixing channel 12 of the support frame 2.

Based on the description above, it is therefore possible to understand how a support frame 2 according to the present invention allows making the application of a cover plate 3 thereto particularly easy.

It should be noted that the provision of pushing means into the fixing channel allows obtaining a reliable fixing of the cover plate 3 to the support frame 2 without imposing an excessive stress of the structural parts that ensure the fixing of the cover plate 3 to the support frame 2.

Advantageously, the provision on the fixing tongue 4 of a surface 31 shaped as a saw tooth and adapted for cooperating with a relief element 14 provided in the fixing channel 12 allows aligning the cover plate 3 parallel to the fixing wall also when, for example due a non-prefect installation of the flush mounted box into the wall, the frame body 7 of the support frame 2 is not perfectly aligned with such fixing wall.

Moreover, it should be noted that, advantageously, the provision of a pushing tooth against a curved surface allows such tooth not to jib against the fixing tongue 4 during the removal of the cover plate 3 from the support frame 4.

Of course, the man skilled in the art can mane numerous modifications and variations to the support frame described above, in order to satisfy contingent and specific requirements, all of which are in any case covered by the scope of protection of the invention as defined by the following claims.

The invention claimed is:

1. A support frame for wall-mounting at least one electrical apparatus, the frame comprising:
    a frame body fixable to the wall and developing about a window defining a mounting seat adapted for receiving and holding said at least one electrical apparatus; and
    fixing means for removably fixing a cover plate to the support frame and including at least one fixing channel exhibiting an end jointed to an opening obtained in the frame body, the fixing channel operative for receiving, through such opening, a corresponding fixing tongue, provided in the cover plate, wherein a surface of the fixing tongue includes at least one portion of the surface shaped as a saw tooth, the fixing channel including therein relief means operative to face the surface of the tongue, and pushing means adapted for acting on such tongue for engaging pressure-wise the surface of the tongue against said relief means inside the fixing channel.

2. The support frame according to claim 1, wherein said pushing means are such as to cooperate with a surface substantially smooth of said fixing tongue opposite said shaped surface.

3. The support frame according to claim 1, wherein the relief means includes at least one element protruding from a first inside wall of the fixing channel and the pushing means includes a flexible and inclined tooth having a first end protruding inwards of said channel and a second end constrained to a second inside wall of said channel opposite said first inside wall.

4. The support frame according to claim 3, wherein said protruding element includes a tooth protruding from said first inside wall.

5. The support frame according to claim 4, wherein said protruding tooth has a substantially triangular profile.

6. The support frame according to claim 3, wherein said first end of the tooth is a curved end.

7. The support frame according to claim 3, wherein said frame body includes at least one notch adjacent said channel, said pushing means including a sheet element comprising said flexible tooth, the sheet element being insertable in said notch so that said tooth protrudes inwards of the fixing channel.

8. The support frame according to claim 7, wherein the sheet element is insertable snap-wise into the notch.

9. A group of parts for wall mounting at least one electrical apparatus, comprising:
    a cover plate including a plurality of fixing tongues;
    a support frame according to claim 1, including a plurality of fixing channels, each adapted for receiving and holding a respective fixing tongue of said plurality of fixing tongues.

* * * * *